United States Patent [11] 3,632,139

[72] Inventor George T. Stafford, Jr.
P.O Box 2885, Birmingham, Ala. 35212
[21] Appl. No. 16,490
[22] Filed Mar. 4, 1970
[45] Patented Jan. 4, 1972

[54] REMOVABLE GOOSENECK DRAWBAR FOR TRAILERS
6 Claims, 5 Drawing Figs.
[52] U.S. Cl................................................... 280/425 A
[51] Int. Cl................................................... B62d 53/06
[50] Field of Search........................................ 280/423 B, 425 A

[56] References Cited
UNITED STATES PATENTS
2,967,720 1/1961 Smith et al.................. 280/425 A
3,043,609 7/1962 Talbert......................... 280/423 B
FOREIGN PATENTS
778,055 7/1957 Great Britain................ 280/423 B Primary Examiner—Leo Friaglia
Attorney—Jennings, Carter and Thompson ABSTRACT: Gooseneck drawbar having depending rear portion pivotally connected to trailer bed. Upstanding bracket carried by depending rear portion and having lateral support engageable with trailer bed determining relative angular position of drawbar and trailer bed. Bracket held at selected angular positions to vary elevation of forward end of trailer bed.

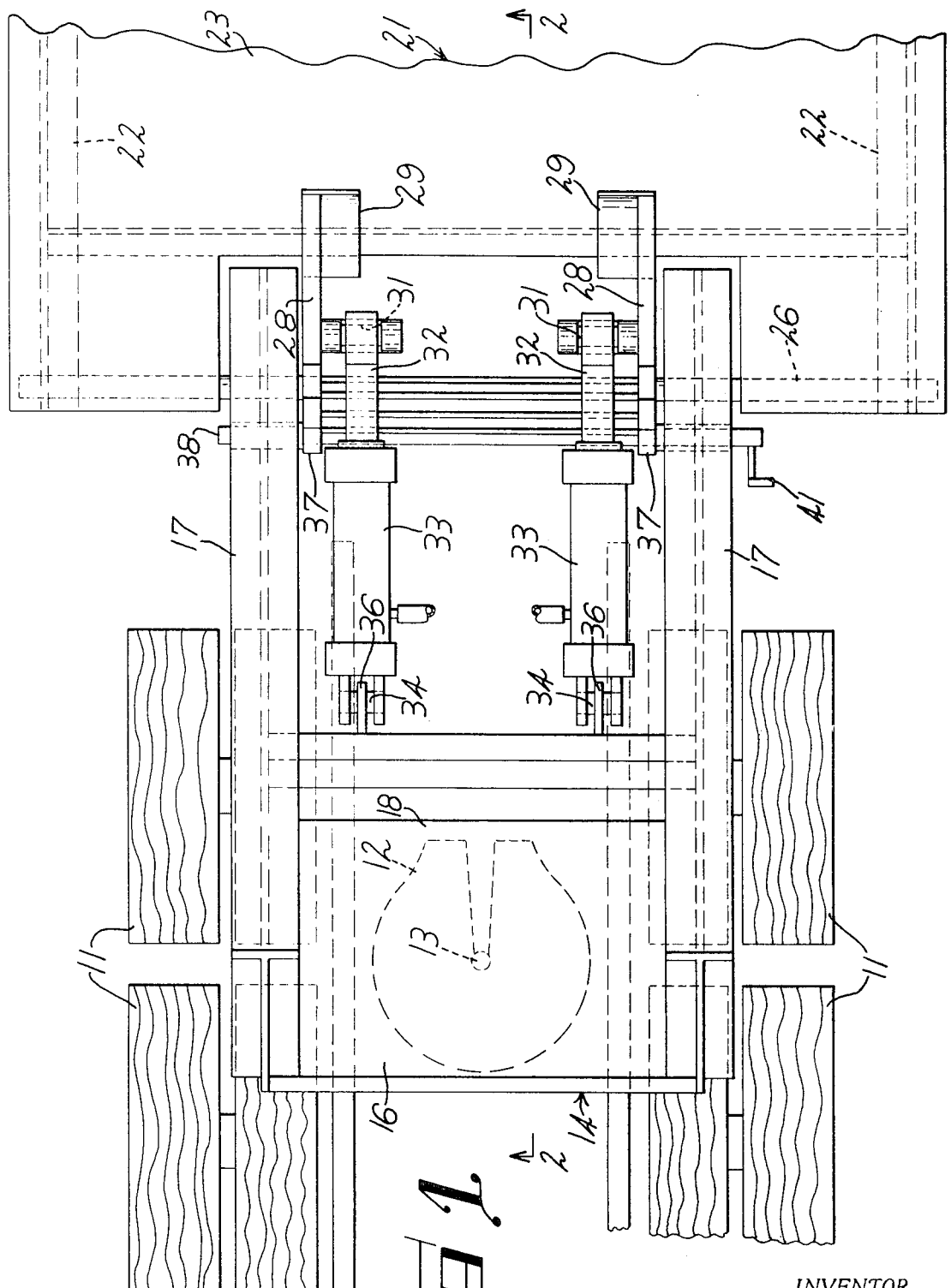

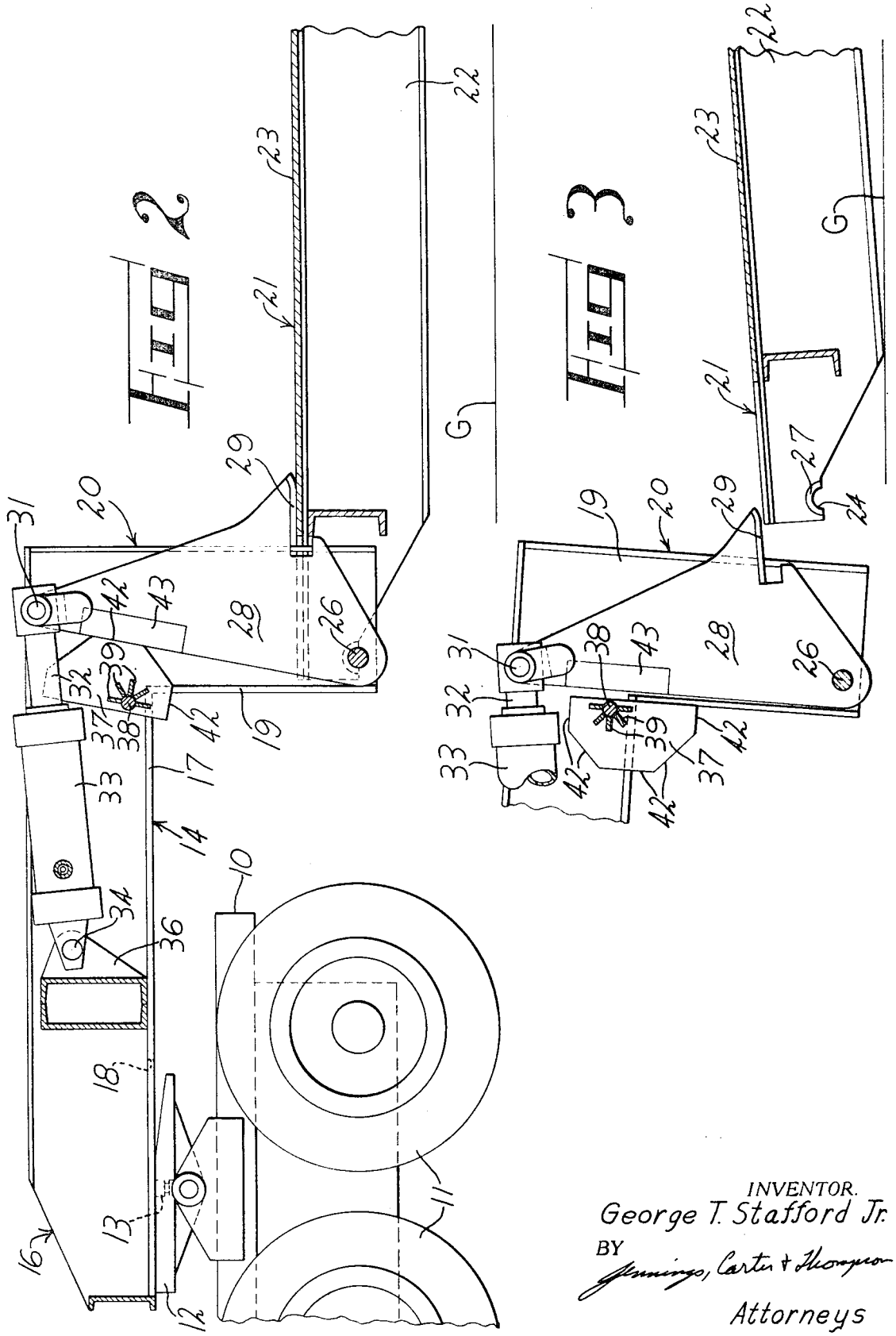

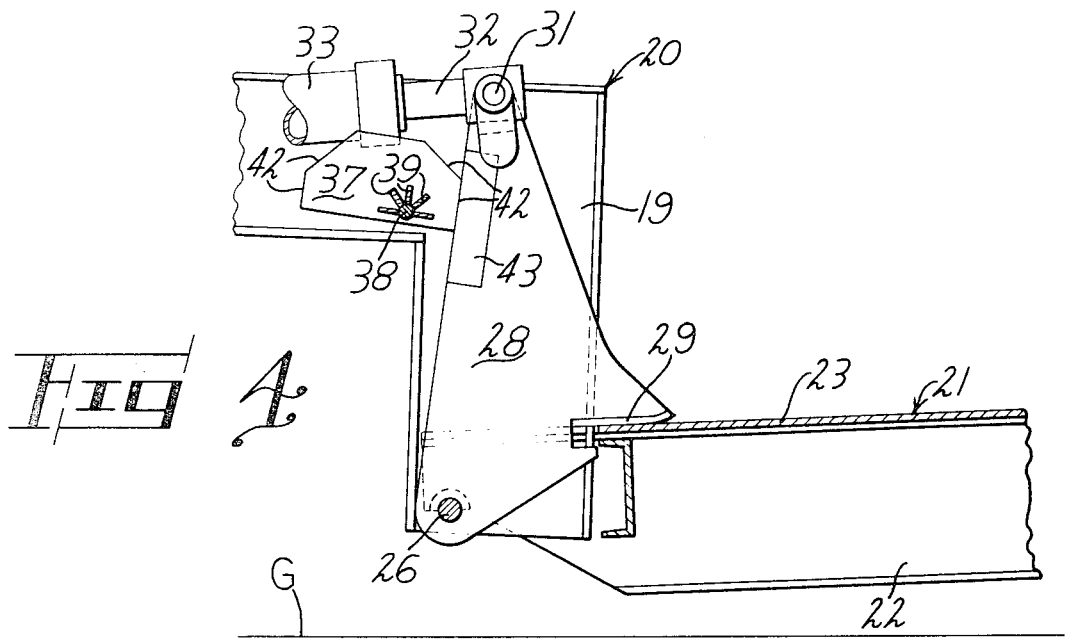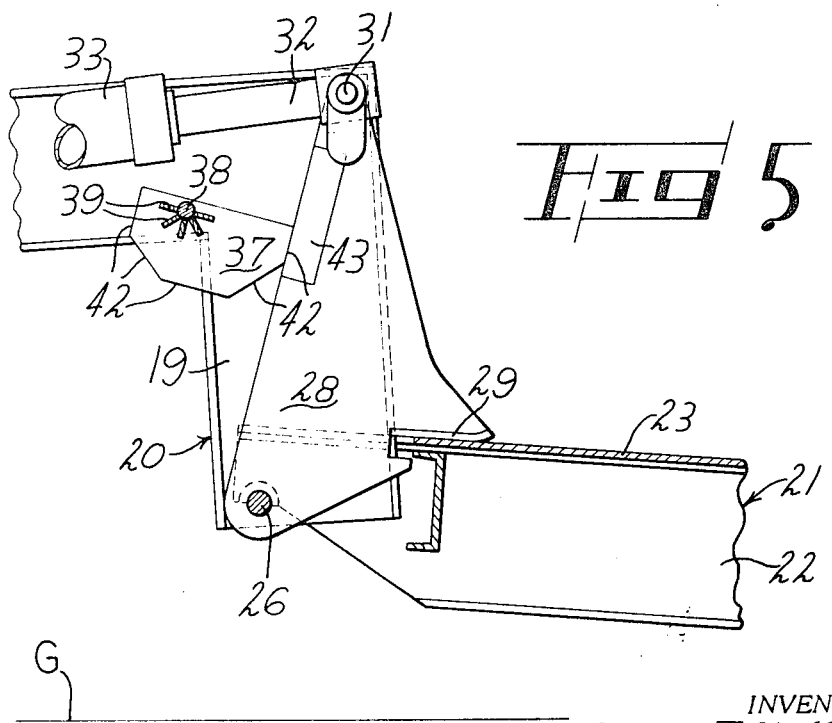

3,632,139

REMOVABLE GOOSENECK DRAWBAR FOR TRAILERS

BACKGROUND OF THE INVENTION

This invention relates to a removable gooseneck drawbar for trailers and more particularly to such a drawbar which shall be adapted for pivotal movement relative to the forward end of the trailer bed carried thereby and shall include improved means for holding the drawbar at selected angular positions relative to the forward end of the trailer bed whereby the elevation at which the forward end of the trailer bed is supported may be varied and then retained in a set position.

Heretofore in the art to which my invention relates, difficulties have been encountered in moving low-bed trailers over obstacles, such as railroad tracks due to the fact that the forward end of the low-bed trailer often moves very close to the surface, especially at which the tractor and trailer wheels are supported. Also, since low-bed trailers are often employed to transport a high load through an underpass or the like, it is very desirable to decrease the deck height of the trailer when passing under such overhead structures. Furthermore, since tractors do not all have the same fifth wheel height, it is very desirable to increase or decrease the king pin height of the gooseneck drawbar to compensate for such differences in fifth wheel elevations of tractors whereby the forward end of the trailer bed is supported at a predetermined elevation. Another desirable feature of a gooseneck drawbar is that it can be easily removed from the forward end of the trailer bed and at the same time it is desirable to have positive means for retaining the gooseneck drawbar and trailer bed at a set angular position relative to each other independent of the hydraulic system.

BRIEF SUMMARY OF THE INVENTION

Briefly, my improved gooseneck drawbar comprises a depending rear portion pivotally connected to the forward end of a trailer bed. Upstanding brackets are carried by the depending rear portion and have lateral supports engageable with the trailer bed to determine the relative angular position of the drawbar and trailer bed. The upstanding brackets are held at selected angular positions relative to the drawbar to thus vary the elevation at which the forward end of the trailer bed is supported. Positive means is provided between the drawbar and the upstanding bracket for holding the bracket at selected angular positions.

Apparatus embodying features of my invention is illustrated in the accompanying drawing, forming a part of this application, in which:

FIG. 1 is a top plan view, partly broken away shown my improved gooseneck and fragments of the tractor and trailer bed connected thereto;

FIG. 2 is a sectional view taken generally along the line 2—2 of FIG. 1, portions of the tractor being shown in elevation, and the trailer bed being shown in normal load carrying position;

FIG. 3 is a fragmental view showing the gooseneck drawbar removed from the forward end of the trailer bed;

FIG. 4 is a fragmental view showing the drawbar connected to the forward end of the trailer bed with the forward end of the trailer bed supported in a lowered position; and, FIG. 5 is a fragmental view showing the drawbar connected to the trailer bed with the forward end of the trailer bed being supported in a raised position.

Referring now to the drawings for a better understanding of my invention, I show a fragment of a tractor 10 which is supported by wheels 11 and is provided with a conventional type fifth wheel 12 adapted to receive a king pin 13.

As shown in FIGS. 1 and 2, the king pin 13 is carried by and depends from the forwardly extending portion 16 of a gooseneck drawbar 14. The forwardly extending portion of the drawbar 14 is shown as comprising spaced apart I-beams 17 which are spaced from each other, as shown in FIG. 1. Extending transversely between the lower flanges of the I-beams 17 is a plate member 18.

Secured to the rear portion of each I-beam 17 is a depending I-beam 19 which is adapted to be pivotally and detachably connected to the forward end of a trailer bed indicated generally at 21 in a manner to be described hereinafter.

The trailer bed 21 is provided with a longitudinally extending I-beam 22 at each side thereof, as shown in FIG. 1. Secured rigidly to the upper surfaces of the I-beams 22 is a plate 23. As shown in FIG. 3, the forward end of each I-beam 22 is provided with a downwardly opening recess 24 which is in position to engage a transverse shaft 26 which extends transversely through suitable openings provided in the depending I-beams 19 whereby the forward end of the trailer bed 21 is pivotally connected to the lower portion of the depending beams 19 of which define a depending rear portion 20 for the gooseneck drawbar 14. The downwardly opening recess 24 is preferably provided with a suitable bearing inert 27 to reduce friction. The downwardly opening recess 24 and its bearing insert 27 also serve as a positive alignment socket to insure proper positioning between the drawbar and the trailer bed.

Mounted for pivotal movement on the transverse shaft 26 are laterally spaced, upstanding brackets 28 which are positioned inwardly of and adjacent the depending rear portion of the gooseneck drawbar, as shown in FIG. 1. Each upstanding bracket 28 carries a lateral support 29 which is engagable with the upper surface of the trailer bed 21 whereby the angular position of the upstanding bracket 28 determines the angular position of the trailer bed 21 relative to the depending rear portion 20 of the gooseneck drawbar 14.

To vary the angular position of the upstanding brackets 28, the upper end of each bracket 28 is pivotally connected by a pivot pin 31 to a piston rod 32 of a fluid pressure operated cylinder 33. The end of the cylinder 33 opposite the piston rod 32 is pivotally connected by a pivot pin 34 to a support bracket 36 which in turn is carried by the gooseneck drawbar 14, as shown in FIG. 2. Fluid under pressure, such as hydraulic fluid, is introduced into the cylinder 33 in a manner well understood in the art whereby the piston rod 32 and the bracket 28 connected thereto is moved to selected positions to thus move the forward end of the trailer bed 21 to selected angular positions relative to the gooseneck drawbar.

To retain the upstanding brackets 28 in a positive, predetermined position independently of the force exerted by piston rod 32 of cylinder 33, each upstanding bracket 28 is engaged by a camlike member 37. The camlike members 37 are mounted rigidly on a transverse shaft 38 which extends through suitable openings provided in the gooseneck drawbar, as shown. The camlike members 37 are spaced laterally from each other, as shown in FIG. 1, and are braced by suitable transverse braces 39 which extend between the camlike members 37, as shown. To rotate the shaft 38 and the camlike members 37 carried thereby, a suitable handle 41 is carried by the shaft 38, as shown in FIG. 1.

Each camlike member 37 is provided with a plurality of generally flat contact surfaces 42 which are spaced at different distances from shaft 38 and extend at different angular positions relative to each other when in contact with the upstanding bracket 28 whereby the bracket 28 is retained at a selected angular position. As shown in FIGS. 2-5, each upstanding bracket 28 is provided with a wear plate 43 which engages selected ones of the flat contact surfaces 42 of its associated camlike member 37.

From the foregoing description, the operation of my improved removable gooseneck drawbar for trailers will be readily understood. In FIG. 2, the trailer 21 is shown in the normal load carrying position with one of the flat contact surfaces 42 engaging the wear plate 43 to hold each upstanding bracket 28 in a predetermined set position whereby the engagement of the shaft 26 with the downwardly opening recess 24 and the engagement of the lateral support 29 with the upper surface of the trailer bed 21 retains the forward end of the trailer bed in the position shown in FIG. 2.

To lower the forward end of the trailer bed 21 so as to decrease the overall height of the load carried by the trailer bed, fluid under pressure is introduced into cylinder 33 whereby piston rod 32 is moved outwardly to release pressure on the camlike member 37. The camlike 37 is then rotated by handle 41 to position the proper flat, contact surface 42 opposite the wear plate 43 to retain the upstanding bracket 38 in the set position shown in FIG. 4. With the camlike member 37 thus positioned, the pressure to the cylinder 33 is released whereby the upstanding brackets 28 are held in place positively by the camlike members 37.

To elevate the forward end of the trailer bed 21 above the position shown in FIG. 2, fluid under pressure is introduced into cylinder 33 to extend the piston rod 32 whereby pressure is taken off the camlike member 37. The camlike member 37 is then rotated to the position shown in FIG. 5 whereupon a flat contact surface 42 engages the wear plate 43 to thereby retain the upstanding brackets 28 in the predetermined set position shown in FIG. 5. The pressure in cylinder 33 is then released whereupon the brackets 28 are supported positively by the camlike members 37 rather than being supported by the fluid pressure operating units.

To remove the gooseneck drawbar 14 from the forward end of the trailer bed 21, fluid under pressure is introduced into cylinder 33 to release pressure on the camlike members 37 whereupon the camlike members 37 are then rotated by handle 41 to the position shown in FIG. 3. The pressure in cylinder 33 is then gradually released whereupon the upstanding brackets 28 move in a counterclockwise direction about shaft 26, as viewed in FIG. 3, to thus permit the forward end of the trailer bed 21 to engage the ground other supporting surface G. Continued retraction of the piston rod 32 permits the shaft 26 to drop from beneath the downwardly opening recesses 24. A suitable block or other support, not shown, is placed between the gooseneck drawbar 14 and the subjacent tractor frame 10 before removing the gooseneck from the trailer whereby the gooseneck is supported entirely from the tractor frame 10. Then the gooseneck drawbar 14 is removed from the forward end of the trailer bed 21.

From the foregoing, it will be seen that I have devised an improved removable gooseneck drawbar and means for holding the drawbar at selected angular positions relative to the forward end of a trailer bed. By positively retaining the forward end of the trailer bed in predetermined set positions by the camlike members, the load is supported by the camlike members independently of the fluid pressure operated units.

Also, by providing quick actuating means for holding the forward end of the trailer bed at selected elevations, together with quick actuating means for separating the forward end of the gooseneck drawbar from the trailer bed, a minimum of time is required to move the trailer bed to selected elevations and at the same time the gooseneck drawbar may be easily and quickly connected to and removed from the trailer bed.

While I have shown my invention in but one form, it will be obvious to those skilled in the art that it is not so limited but is susceptable of various other changes and modifications without departing from the spirit thereof.

What I claim is:

1. In apparatus for supporting the forward end of a load hauling trailer bed from the fifth wheel of a tractor:
   a. a gooseneck drawbar having a forwardly extending portion adapted to be connected to the fifth wheel of a tractor and a depending rear portion pivotally connected to the forward end of a load hauling trailer bed,
   b. a pair of upstanding brackets mounted on a common shaft carried by said depending rear portion and adopted for pivotal movement relative to said depending rear portion,
   c. there being a downwardly opening recess carried by the forward end of said trailer bed in position to engage said common shaft whereby the forward end of said trailer bed is accurately aligned with and pivotally connected to said gooseneck drawbar,
   d. lateral support members carried by said brackets and engageable with said trailer bed determining the angular position of said trailer bed relative to said depending rear portion, and
   e. means holding said brackets at selected angular positions to vary the relative angular positions of said trailer bed and said depending rear portion and thereby vary the elevation at which the forward end of said trailer bed is supported.

2. In apparatus for supporting the forward end of a load hauling trailer bed from the fifth wheel of a tractor:
   a. a gooseneck drawbar having a forwardly extending portion adapted to be connected to the fifth wheel of a tractor and depending rear portion pivotally connected to the forward end of a load hauling trailer bed,
   b. at least one upstanding bracket pivotally connected to said depending rear portion,
   c. a lateral support member carried by said bracket and engageable with said trailer bed determining the angular position of said trailer bed relative to said depending rear portion, and
   d. a camlike member disposed to engage a side of said bracket and hold said bracket at selected angular positions to vary the relative angular positions of said trailer bed and said depending rear portion and thereby vary the elevation at which the forward end of said trailer bed is supported, and
   e. means to rotate said camlike member to selected positions relative to said bracket.

3. Apparatus for supporting the forward end of a load hauling trailer bed from the fifth wheel of a tractor as defined in claim 2 in which said camlike member has a plurality of generally flat contact surfaces which extend at different angular positions relative to each other when in contact with said bracket so that said bracket is retained at said selected angular positions.

4. Apparatus for supporting the forward end of a load hauling trailer bed from the fifth wheel of a tractor as defined in claim 2 in which said camlike member is carried by an operating shaft and means is provided for rotating said operating shaft to position said bracket at said selected positions.

5. Apparatus for supporting the forward end of a load hauling trailer bed from the fifth wheel of a tractor as defined in claim 2 in which a power actuated member is operatively connected to said bracket and said gooseneck drawbar for moving said bracket about its pivotal connection independent of movement of said camlike member.

6. Apparatus for supporting the forward end of a load hauling trailer bed from the fifth wheel of a tractor as defined in claim 5 in which said power actuated member is a fluid pressure operated unit pivotally connected at one end thereof to said gooseneck drawbar and pivotally connected at the other end thereof to said bracket.

* * * * *